United States Patent [19]
Struttmann

[11] 3,912,412
[45] Oct. 14, 1975

[54] SHAFT LOCKING DEVICE

[75] Inventor: Hilarius S. Struttmann, St. Charles, Ill.

[73] Assignee: Borg-Warner Corporation, Chicago, Ill.

[22] Filed: Nov. 22, 1974

[21] Appl. No.: 526,205

Related U.S. Application Data

[63] Continuation of Ser. No. 331,146, Feb. 9, 1973, abandoned.

[52] U.S. Cl. .............................. 403/368; 308/236
[51] Int. Cl.[2] ...................... F16B 2/14; F16B 7/04
[58] Field of Search ........... 403/365, 367, 368, 369, 403/371, 374; 308/202, 207 R, 210, 236

[56] References Cited
UNITED STATES PATENTS

| | | | |
|---|---|---|---|
| 1,116,845 | 11/1914 | Rogers | 403/371 |
| 3,131,955 | 5/1964 | Kopec | 403/368 |
| 3,709,575 | 1/1973 | Howe, Jr. | 308/236 |

*Primary Examiner*—M. Henson Wood, Jr.
*Assistant Examiner*—Richard A. Bertsch
*Attorney, Agent, or Firm*—Aubrey L. Burgess

[57] ABSTRACT

A relatively compact structure for locking power transmission parts, such as bearings, pulley, gears, sprockets and the like to shafts which comprises an axially extending cylindrical portion of the part having an inside truncated conical surface surrounding the shaft, and a split sleeve having an exterior surface complementary to the inside surface and a bore for the shaft whereby a wedging action caused by axially moving the sleeve with respect to the part, the part is locked to the shaft.

12 Claims, 6 Drawing Figures

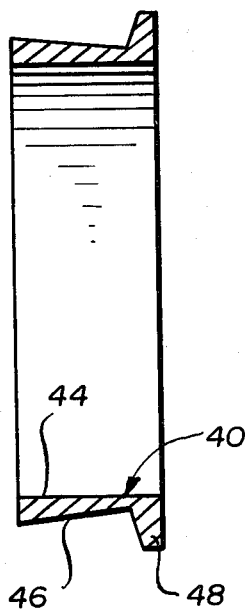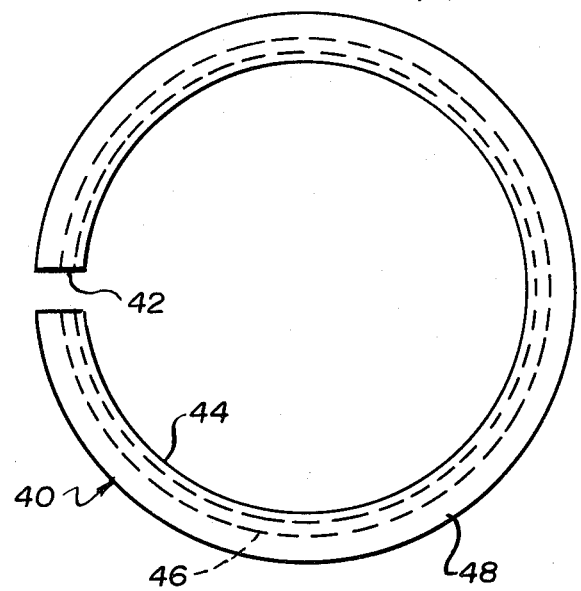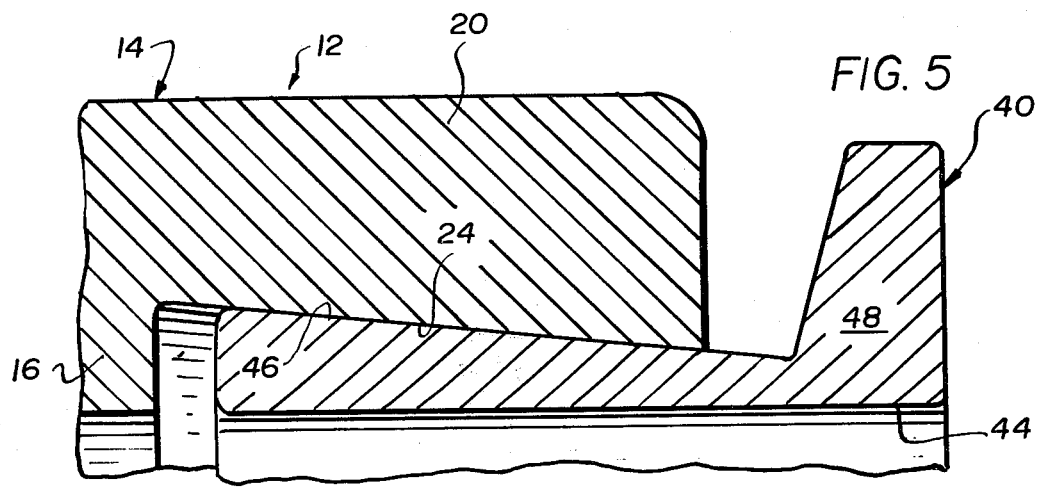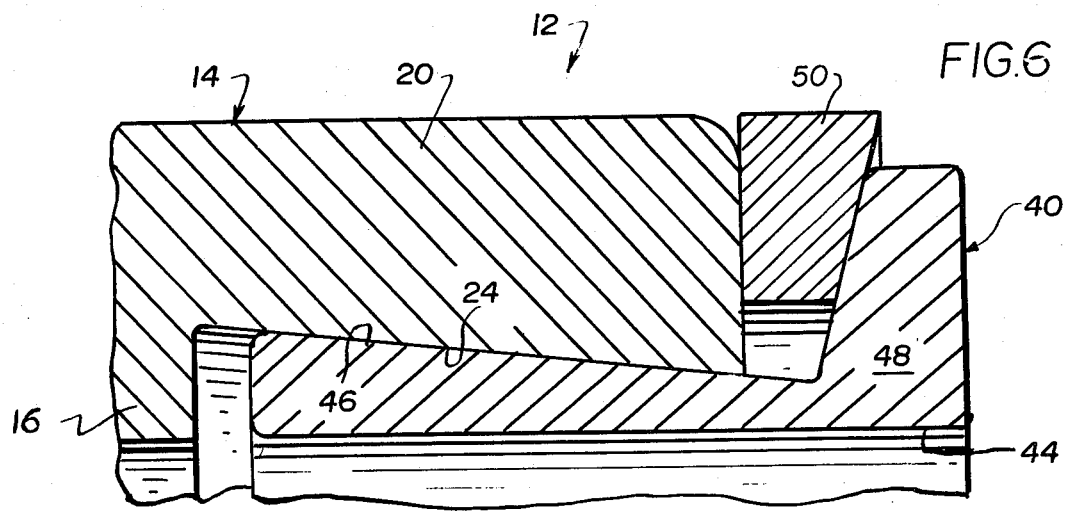

SHAFT LOCKING DEVICE

This is a continuation of application Ser. No. 331,146, filed Feb. 9, 1973, now abandoned.

BACKGROUND OF THE INVENTION

There are many known arrangements for locking transmission parts, such as bearings, pulleys, gears, sprockets or the like to a shaft for rotation therewith. One of the simplest forms is the set screw through the hub of the transmission part. Locking collars which are associated with extensions of the hub of the transmission part are also used, and, while more expensive than the simple set screw arrangement, have been found to be satisfactory.

In any case, many of the known locking arrangements are such as to cause the transmission part to be cocked, to be positioned off-center, or to move with respect to the shaft.

The movement and/or misalignment of the part causes a condition known as fretting or fretting corrosion; a wearing away of parts of the assembly by mechanical as well as chemical action.

Set screws frequently cause burrs on the shaft. Fretting of sufficient magnitude may require the replacement of the shaft; burrs offer an obstruction during disassembly and assembly of the transmission parts.

The prior art arrangements just described require considerable time for locking and/or unlocking the transmission part to the shaft because of the screw arrangement.

Another more recent development in the shaft locking art is the use of a plurality of spring-like clips which are wedged between the transmission part and the shaft. These clips are relatively inexpensive, but their disadvantages outweigh their advantages. It is difficult to center the part with respect to the axis of the shaft, so that misalignment and fretting corrosion occurs. Thus, replacement of a relatively expensive shaft may be a frequent necessity.

THE INVENTION

This invention uses a split sleeve having a cylindrical bore, a conical outside configuration and an end flange as a locking element. The sleeve is collapsed sufficiently to insert it into the transmission part, such as a bearing, sheave, pulley, gear, sprocket, and the like, and expands by its natural spring action to a bore diameter which is larger than the diameter of the shaft on which the transmission part is to be mounted. The transmission part is provided with a portion having a bore to receive the shaft and at least one axial portion with a conical bore complementary to the conical outside configuration of the sleeve. To lock the part with the shaft, the sleeve is partially withdrawn in an axial direction from the part. This partial withdrawal collapses the sleeve and wedges it between the shaft and the conical bore of the part being locked to the shaft.

In some cases, a split retaining ring is inserted between the end of the transmission part and the flange of the sleeve.

The locking arrangement attaches the transmission part to the shaft, centers its axis with the axis of the shaft to give a true running condition. It eliminates the off-center or out-of-balance created by the prior art locking arrangements before described. The bore of the sleeve is such to provide an area contact with the shaft, so that no burrs are formed on the shaft.

The angle of the conical surface is chosen to provide the self-locking arrangement. The critical angle is one whose tangent equals the coefficient of friction between the contacting surfaces. Angles smaller than this will be self-locking; larger angles will not be self-locking. The coefficient of friction will vary because of materials used, accuracy of fit, surface finishes, cleanliness of surfaces, and absence or presence of and/or type of lubricant. Generally it has been found in most cases that a suitable angle is between approximately two and ten degrees. Under severe loads and when a deflection of the shaft may occur, it may be desirable to use the split locking ring, as above described.

An important feature of this invention is the fact that the locking arrangement is axially offset from the critical load bearing or rolling elements of the part and obviates the use of an interference fit between the shaft and the part while centering the axis of the part with the axis of the shaft.

THE DRAWINGS

FIG. 3 is a sectional view of a locking sleeve used in the arrangement of FIG. 1.

FIG. 4 is a view of the sleeve of FIG. 3;

FIG. 5 is an enlarged partial view of the locking arrangement; and

FIG. 6 is a view similar to FIG. 5 showing the use of a locking ring.

DETAILED DESCRIPTION

Figure 1:
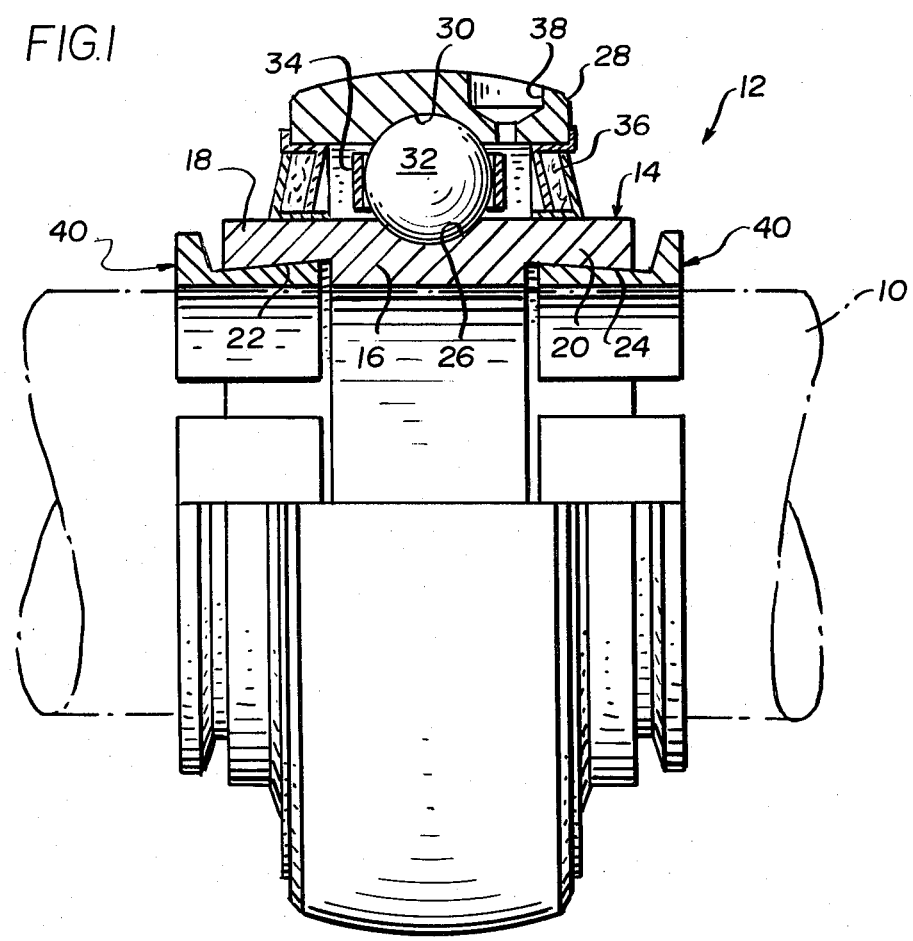
FIG. 1 is a partial sectional view of an arrangement according to this invention used to lock a ball bearing to a shaft (indicated by broken lines)
Figure 2:
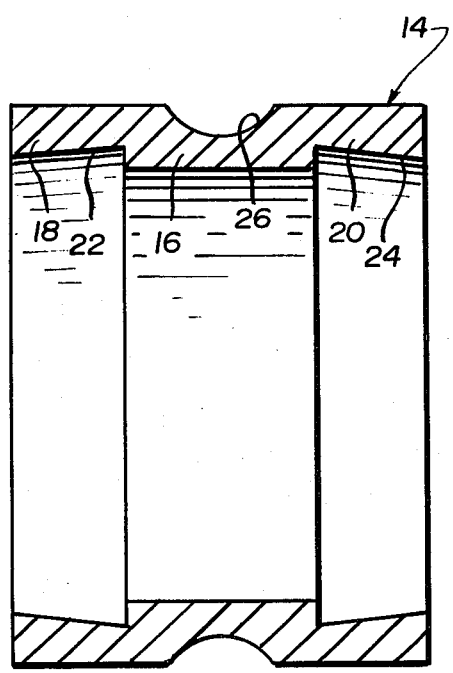
FIG. 2 is a sectional view of an inner raceway of the bearing in FIG. 1.

To explain this invention, reference is made to the drawings; they show the locking arrangement in combination with a ball bearing. This is for purpose of illustration only, it being understood that this invention is applicable for use with many transmission parts, such as pulleys, sheaves, gears, sprockets, and the like, as well as the illustrated ball bearings. It is also applicable to other types of bearings, not illustrated.

In the drawings, there is illustrated, by broken lines, a shaft 10, on which is to be mounted and locked therewith for concurrent rotation, a transmission part, generally identified as 12 which includes a cylindrical member 14. The cylindrical member 14 has a central portion 16 with an inside bore to surround the shaft 10 and axial portions 18 and 20, each with a conical inside surface 22 and 24, respectively. The surfaces 22 and 24 are angled to provide a locking taper. The angle of the conical surfaces 22 and 24 is chosen to provide a self-locking arrangement. The critical angle is one whose tangent equals the coefficient of friction between the surfaces. Angles smaller than this critical angle are self-locking while larger angles than the critical angle are not self-locking. Generally, it has been found that in most cases in a structure as herein described and shown that a suitable, self-locking angle is between approximately two and ten degrees with respect to the longitudinal axis of the shaft 10.

In the structure shown in FIG. 1, the member 14 is the inner race of a bearing, with a raceway 26 formed in the portion 16. The bearing includes an outer race member 28 formed with a raceway 30, and a plurality of balls 32 disposed between the raceways 26 and 30. A retainer 34 holds the balls 32 in spaced relationship with one another and appropriate edge seals 36 are provided. Lubrication is introduced through lubricant passage 38.

To lock the bearing or part 12 to the shaft 10, there are provided split locking sleeves 40. Each sleeve, split as at 42 (see especially FIG. 4) has a central bore 44, an outside conical surface 46 substantially complementary to the surface 24 (or 22 as the case may be) and an enlarged end flange 48. The sleeve is pre-assembled with the transmission part (before being assembled onto the shaft 10) by collapsing it sufficiently to be received in the appropriate axial portions of the transmission part with the conical surfaces opposite one another. To lock the part to the shaft, each sleeve is moved axially of the shaft, so as to collapse the sleeve onto the shaft, i.e., the bore 44 engages the shaft, and to wedge the conical surfaces with one another. Thus, the transmission part 12 is properly locked to the shaft 10 with its rotational axis coinciding with the axis of the shaft.

In some situations it may be desirable to provide an additional feature, i.e., a split locking ring 50 is wedged between the end of the transmission part and the flange 48 of the split sleeve, as illustrated in FIG. 6. By making the ring 50 with a tapered cross-section and driving it in wedge fashion between the elements, additional wedging action between the part and the sleeve occurs.

In the drawings, the transmission part is illustrated as having axial portions at both ends of the central portion. In some cases, where space is a serious limitation and/or under light load situations, only one split sleeve is used. This arrangement provides the desired locking of the transmission component, so that its rotational axis coincides with rotational axis of the shaft. The invention, as thus described, is considered to include this embodiment.

I claim:

1. A bearing having an inner race adapted to be locked to a shaft for rotation with the shaft comprising:
   a member having a cylindrical inner race portion with a bore having an inside diameter to receive the shaft;
   at least one portion extending axially outwardly from said race portion with an interior truncated conical surface diverging with respect to the axis of the race portion;
   an axially split sleeve member receivable in said axially extending portion having an inner diameter to receive said shaft and adapted to be collapsed to wedge with said shaft;
   said sleeve member having an exterior truncated conical surface complementary to the conical surface of said axially extending portion;
   said conical surfaces having an angle with respect to the longitudinal axis of said shaft no greater than an angle whose tangent equals the coefficient of friction between the conical surfaces;
   said sleeve member being movable axially with respect to said race portion to lock said surfaces with respect to one another, thus locking said cylindrical member and said sleeve member together, said sleeve member being collapsed to wedge with said shaft and thus locking said cylindrical member with said shaft for concurrent rotation therewith about a common axis.

2. A bearing as in claim 1 wherein said conical surface of said axially extending portion diverges inwardly in the direction of said inner race portion and with respect to the axis thereof.

3. A bearing as recited in claim 2 further including an enlarged terminal end on said sleeve member which forms a groove with the terminal end of said axially extending portion, and a split snap ring in said groove retaining said sleeve member in wedged and locked position with respect to said cylindrical member and said shaft.

4. A bearing as recited in claim 1 in which said angle of said surfaces in approximately 2° to 10°.

5. A shaft locking device comprising:
   a member having a first cylindrical portion with a bore having an inside diameter to receive the shaft;
   at least one portion extending axially from said cylindrical portion with an interior truncated conical surface diverging with respect to the axis of the first portion;
   an axially split sleeve member receivable in said axially extending portion having an inner diameter to receive said shaft and adapted to be collapsed to wedge with said shaft;
   said sleeve member having an exterior truncated conical surface complementary to the conical surface of said axially extending portion;
   said conical surfaces having an angle with respect to the longitudinal axis of said shaft no greater than an angle whose tangent equals the coefficient of friction between the conical surfaces;
   said sleeve member being movable axially with respect to said first portion to lock said surfaces with respect to one another, thus locking said cylindrical member and said sleeve member together, said sleeve member being collapsed to wedge with said shaft and thus locking said cylindrical member with said shaft for concurrent rotation therewith about a common axis.

6. A shaft locking device as in claim 5 wherein said conical surface of said axially extending portion diverges inwardly in the direction of said cylindrical portion and with respect to the axis thereof.

7. A shaft locking device as recited in claim 6 further including an enlarged terminal end on said sleeve member which forms a groove with the terminal end of said axially extending portion and a split snap ring in said groove retaining said sleeve member in wedged and locked position with respect to said cylindrical member and said shaft.

8. A shaft locking device as recited in claim 5 in which said angle of said surfaces is approximately 2° to 10°.

9. A transmission part such as pulley, gear and the like adapted to be locked to a shaft for rotation with the shaft comprising:
   a hub having a first cylindrical portion having a bore with an inside diameter to receive the shaft;
   at least one portion extending axially from said first portion with an interior truncated conical surface diverging with respect to the axis of the first portion;
   an axially split sleeve member receivable in said axially extending portion having an inner diameter to receive said shaft and adapted to be collapsed to wedge with said shaft;

said sleeve member having an exterior truncated conical surfaces complementary to the conical surface of said axially extending portion;

said conical surfaces having an angle with respect to the longitudinal axis of said shaft no greater than an angle whose tangent equals the coefficient of friction between the conical surfaces;

said sleeve member being movable axially with respect to said first portion to lock said surfaces with respect to one another, thus locking said cylindrical hub and said sleeve member together, said sleeve member being collapsed to wedge with said shaft and thus locking said cylindrical hub with said shaft for concurrent rotation therewith about a common axis.

10. A transmission part as in claim 9 wherein said conical surface of said axially extending portion diverges inwardly in the direction of said cylindrical portion and with respect to the axis thereof.

11. A transmission part as recited in claim 10 further including an enlarged terminal end on said sleeve member which forms a groove with the terminal end of said axially extending portion and a split snap ring in said groove retaining said sleeve member in wedged and locked position with respect to said cylindrical member and said shaft.

12. A transmission part as recited in claim 9 in which said angle of said surfaces is approximately 2° to 10°.

* * * * *

UNITED STATES PATENT OFFICE
CERTIFICATE OF CORRECTION

PATENT NO. : 3,912,412
DATED : October 14, 1975
INVENTOR(S) : HILARIUS S. STRUTTMANN It is certified that error appears in the above-identified patent and that said Letters Patent are hereby corrected as shown below:

Claim 4, line 2, cancel "in" and insert -- is --.

Claim 9, line 15, cancel "surfaces" and insert -- surface --.

Signed and Sealed this third Day of February 1976

[SEAL]

Attest:

RUTH C. MASON
Attesting Officer

C. MARSHALL DANN
Commissioner of Patents and Trademarks